(12) United States Patent
Andronaco et al.

(10) Patent No.: US 11,231,136 B2
(45) Date of Patent: Jan. 25, 2022

(54) FLANGELESS COUPLER FUSED INSIDE OPPOSING ENDS OF CONDUITS

(71) Applicant: Ronald V. Andronaco, Alto, MI (US)

(72) Inventors: Ronald V. Andronaco, Alto, MI (US); Theodore Scofield, Hastings, MI (US)

(73) Assignee: Ronald V. Andronaco, Alto, MI (US)

( * ) Notice: Subject to any disclaimer, the term of this patent is extended or adjusted under 35 U.S.C. 154(b) by 257 days.

(21) Appl. No.: 16/518,076

(22) Filed: Jul. 22, 2019

(65) Prior Publication Data

US 2021/0025522 A1 Jan. 28, 2021

(51) Int. Cl.
*F16L 47/02* (2006.01)
*F16L 13/02* (2006.01)
*B29C 65/00* (2006.01)
*F16L 13/14* (2006.01)

(52) U.S. Cl.
CPC .......... *F16L 47/02* (2013.01); *B29C 66/5221* (2013.01); *F16L 13/0227* (2013.01); *F16L 13/146* (2013.01)

(58) Field of Classification Search
CPC .... F16L 13/0227; F16L 47/02; B29C 66/5221
USPC ................................. 285/21.1, 21.2
See application file for complete search history.

(56) References Cited

U.S. PATENT DOCUMENTS

| | | | |
|---|---|---|---|
| 1,920,449 A * | 8/1933 | Unke ................ | F16L 13/0227 |
| 2,739,829 A * | 3/1956 | Cundiff ............. | B29C 66/5221 |
| | | | 285/21.2 |
| 3,061,503 A | 10/1962 | Gould et al. | |
| 3,508,766 A * | 4/1970 | Berg ................. | 285/21.1 |
| 3,961,814 A | 6/1976 | Byrne et al. | |
| 4,274,662 A | 6/1981 | de Groot et al. | |
| 4,652,019 A * | 3/1987 | von Ahrens ....... | F16L 13/0227 |
| 4,865,674 A * | 9/1989 | Durkin .............. | F16L 47/02 |
| | | | 285/21.2 |
| 5,364,130 A | 11/1994 | Thalmann | |
| 5,462,314 A * | 10/1995 | Goto ................ | B29C 66/5221 |
| | | | 285/21.2 |
| 5,566,984 A * | 10/1996 | Abbema ........... | F16L 13/0227 |
| 6,131,954 A | 10/2000 | Campbell | |
| 6,595,559 B1 | 7/2003 | Readman | |
| 2011/0042096 A1* | 2/2011 | Nutley | |
| 2012/0280488 A1 | 11/2012 | Pionetti | |
| 2013/0114945 A1 | 5/2013 | Pionetti et al. | |

FOREIGN PATENT DOCUMENTS

| DE | 3720577 A1 | 2/1988 |
|---|---|---|
| DE | 3926662 A1 | 2/1991 |

\* cited by examiner

*Primary Examiner* — Zachary T Dragicevich
(74) *Attorney, Agent, or Firm* — Honigman LLP

(57) ABSTRACT

A flangeless conduit coupler for joining the ends of two conduits together includes a metallic element and a polymeric element. The metallic element includes a hollow cylindrical element having a plurality of perforations established therethrough. The polymeric element is overmolded at the metallic element so that the metallic element is encapsulated by the polymeric element with the polymeric element present within the perforations of the metallic element. The coupler is disposed in flared ends of opposing conduits and is fused therein to join the conduits and seal the conduit joint. The coupler has an inside diameter that corresponds with the inside diameter of the conduits remote from the flared ends.

15 Claims, 6 Drawing Sheets

FLANGELESS COUPLER FUSED INSIDE OPPOSING ENDS OF CONDUITS

FIELD OF THE INVENTION

The present invention relates generally to hoses and pipes and conduits and, more particularly to industrial hoses/pipes/conduits that are joined together at coupling joints.

BACKGROUND OF THE INVENTION

Typically, composite hoses or pipes are joined together at their ends via flanges that are formed or established at the ends of adjacent pipes and that are bolted together to secure the two hoses or pipes together to form a longer length of hose or pipe for conveying liquid or gas materials from one location to another (such as between valves and/or pumps or the like).

SUMMARY OF THE INVENTION

The present invention provides a flangeless coupler for coupling or joining the opposed ends of two conduits or hoses or pipes together, while providing a substantially uniform internal diameter along the hoses or pipes even at the junction where they are joined by the flangeless coupler. The flangeless coupler comprises a perforated hollow cylindrical metallic element that is encapsulated in a plastic or polymeric hollow cylindrical part (which is overmolded over and around the metallic element and through the perforations). The flangeless coupler is disposed in opposed ends of two hoses or pipes to be coupled, and the joint is heated to fuse the coupler inside the hose/pipe ends. The flangeless coupler may include a locating ridge or guide ridge that circumscribes the coupler and protrudes radially outward so as to provide a lip against which the hoses or pipes engage to make sure both hoses/pipes being joined properly receive a desired or predetermined length of the flangeless coupler therein.

These and other objects, advantages, purposes and features of the present invention will become apparent upon review of the following specification in conjunction with the drawings.

DESCRIPTION OF THE PREFERRED EMBODIMENTS

Figure 1:
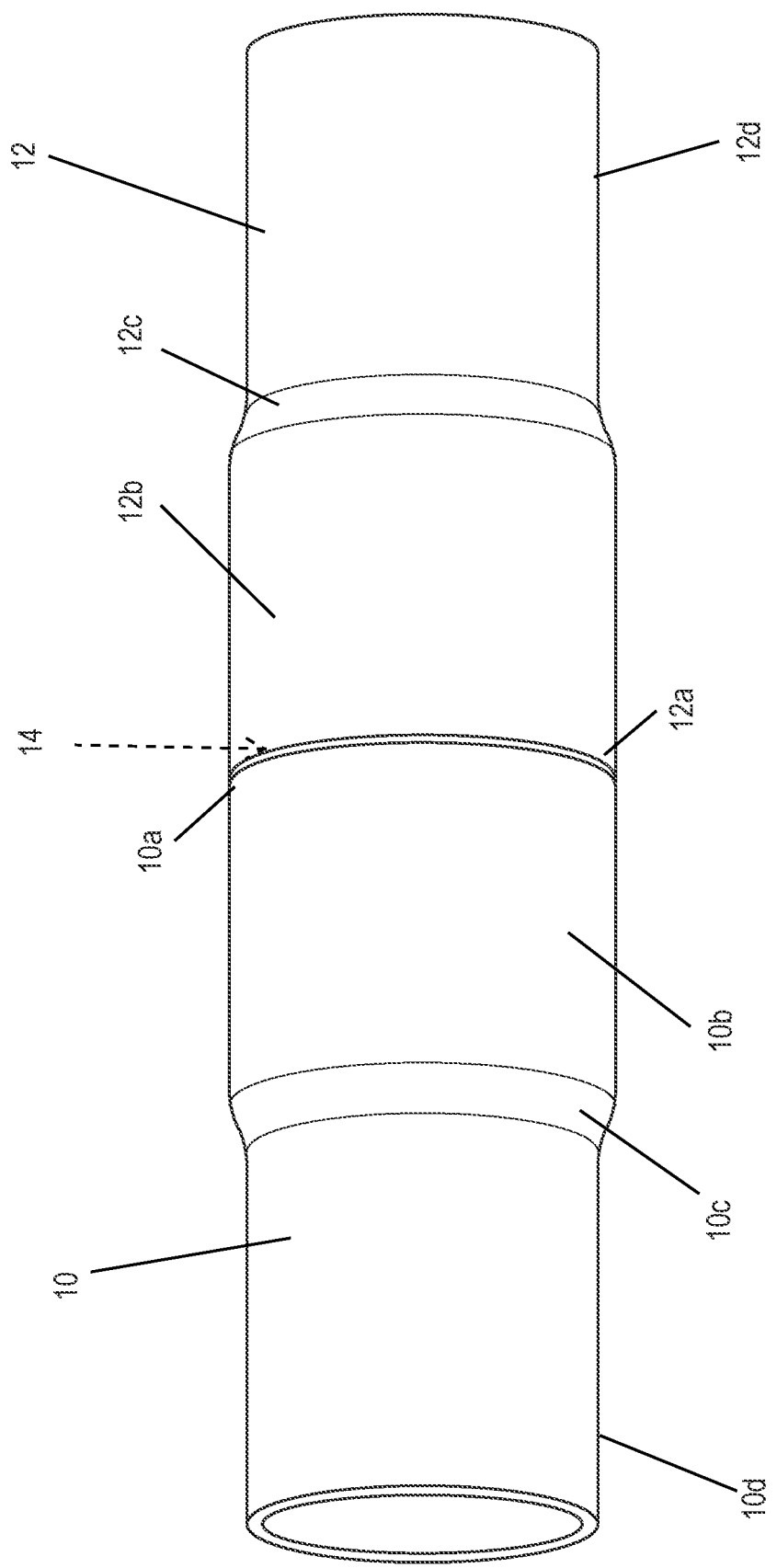
FIG. 1 is a perspective view of two conduits joined together via a flangeless coupler in accordance with the present invention.
Figure 2:
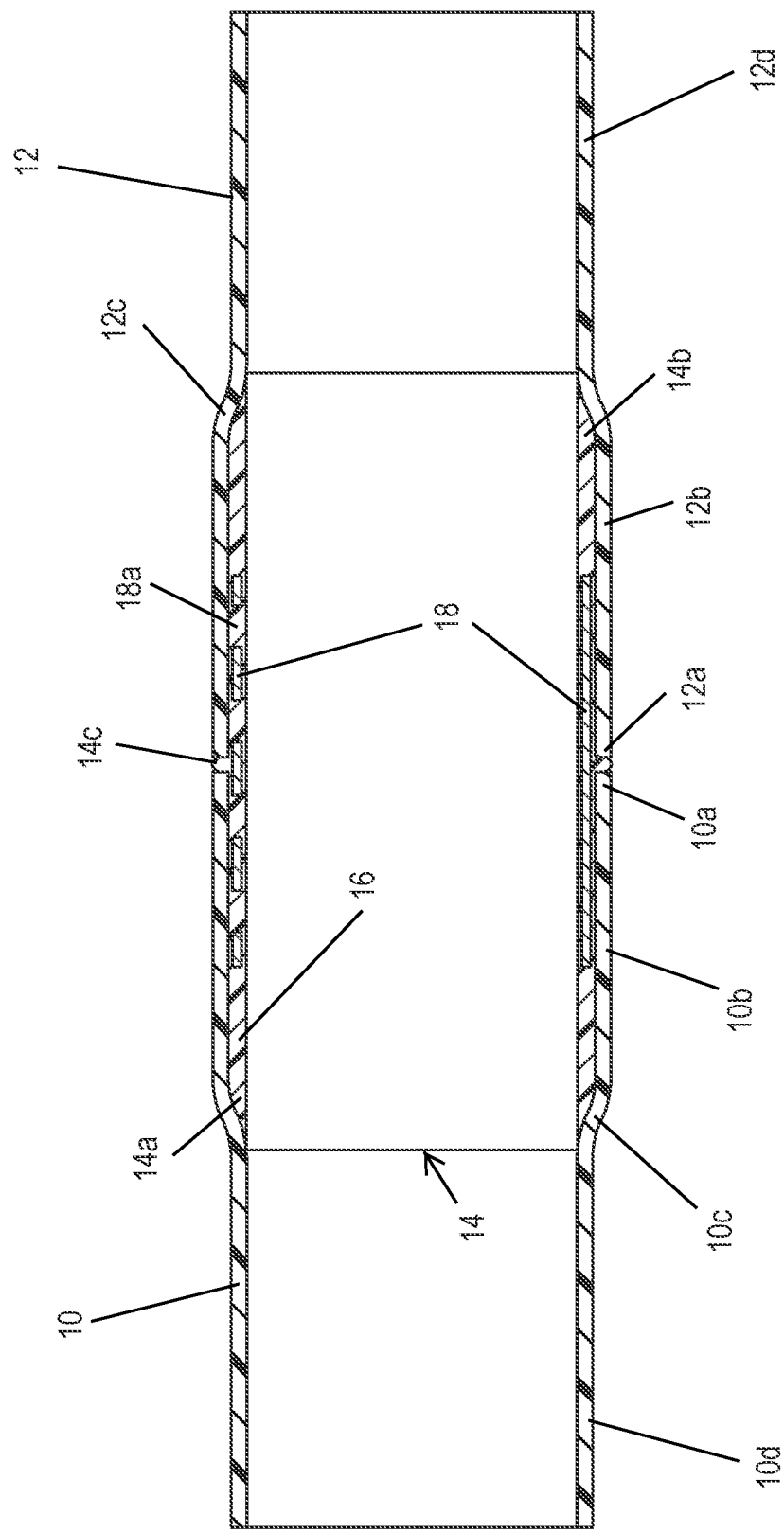
FIG. 2 is a sectional view of the joined conduits of FIG. 1, showing the flangeless coupler joining the two conduits.
Figure 3:
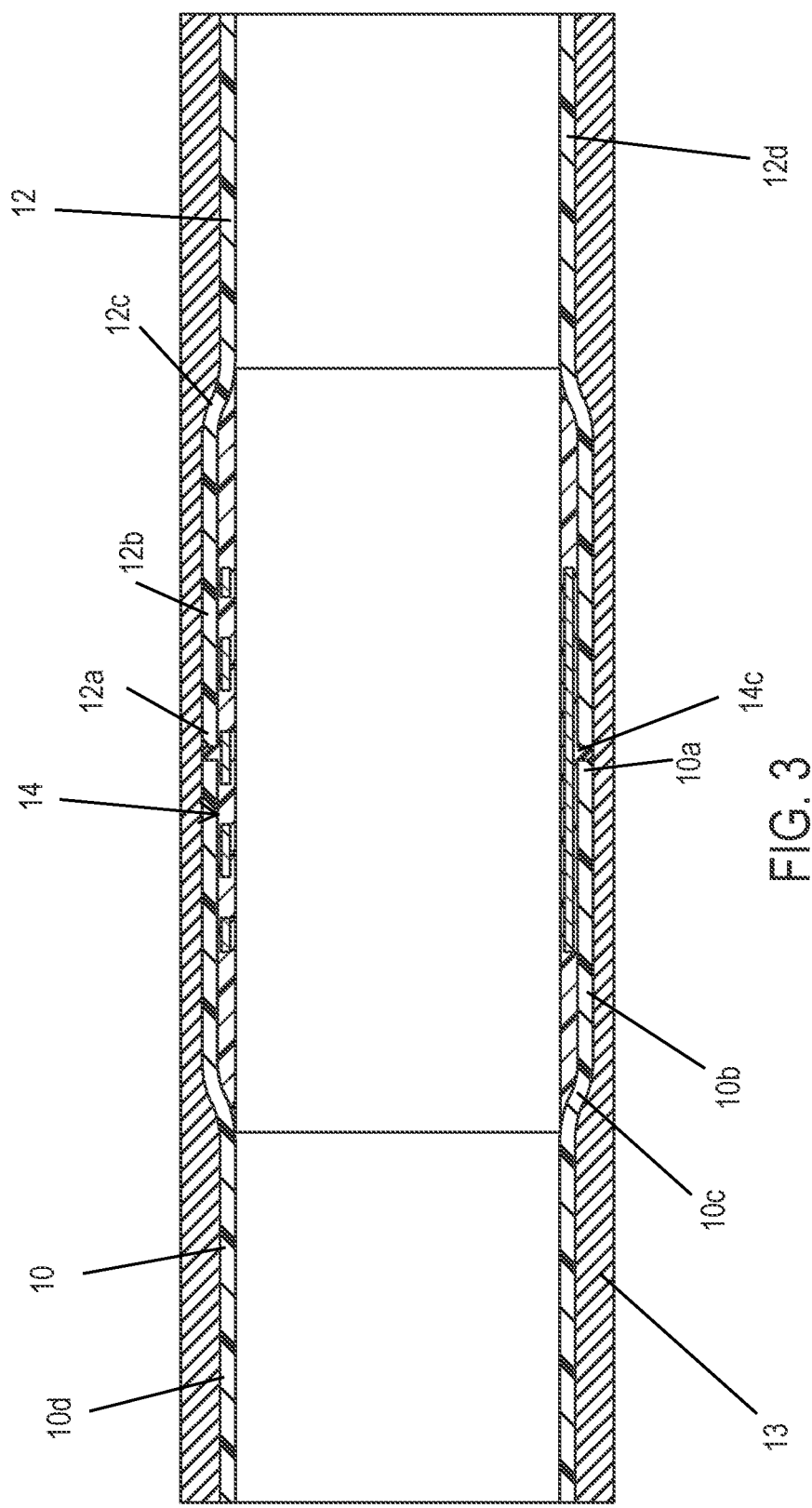
FIG. 3 is another sectional view of the joined conduits, showing the conduits having an outer sleeve established therealong.

Referring now to the drawings and the illustrative embodiments depicted therein, a pair of pipes or tubes or conduits 10, 12 are joined together via a flangeless coupler 14 (FIGS. 1-3). The pipes or tubes are hereinafter referred to as conduits, which may comprise any type of pipe or tube, such as composite pipes or tubes or lined pipes or tubes (such as fluorinated ethylene propylene (FEP) or polytetrafluoroethylene (PTFE) lined conduits) or the like. As shown in FIG. 3, the conduits may have an outer sleeve 13 that is formed over the conduits, and optionally formed over the opposing ends of the conduits at the joint. The conduits 10, 12 are joined at their respective ends 10a, 12a via the flangeless coupler 14, which (as shown in FIGS. 2 and 3) is partially received in each flared end region 10b, 12b of the conduits 10, 12, and is heated to fuse to the inside surfaces of the conduits to join and seal the conduits 10, 12 together.

Figure 4:
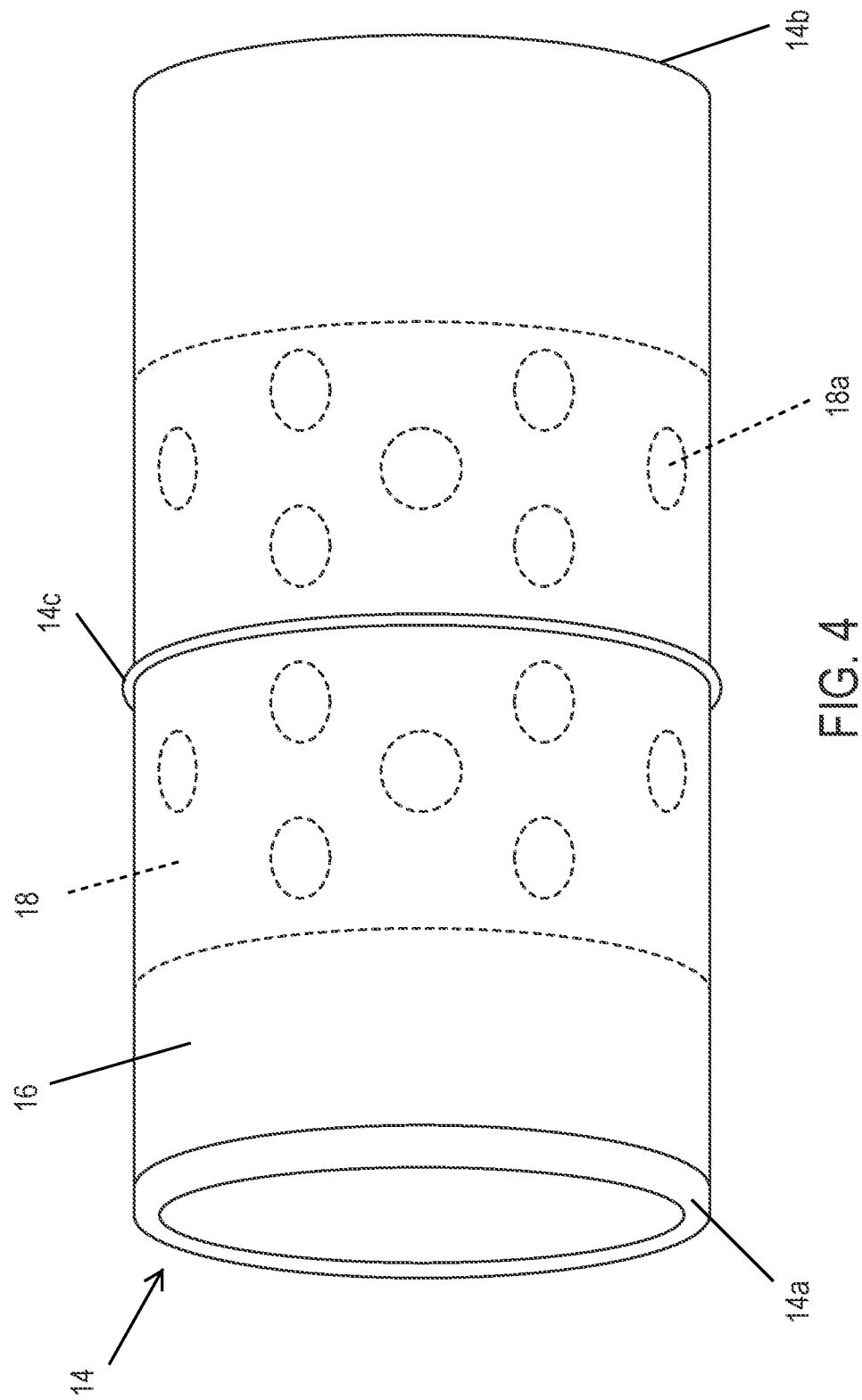
FIG. 4 is a perspective view of the flangeless coupler.

As shown in FIGS. 1-3, the end regions 10b, 12b of the conduits 10, 12 are flared so that the inner diameter of the conduits 10, 12 is larger at the end regions where the flangeless coupler 14 is received. This allows the flangeless coupler 14 to have an inside diameter that is substantially the same as the inside diameter of the conduits 10, 12 at regions (e.g., regions 10d, 12d in FIGS. 1-3) of the conduits 10, 12 remote from the end regions 10b, 12b (such as upstream or downstream from the coupler or joint), such that, when the coupler 14 is disposed within the ends of the conduits and fused therein, the inside diameter of the overall joined conduit remains constant or uniform or substantially uniform (as can be seen with reference to FIGS. 2 and 3). As shown in FIGS. 2-4, the ends 14a, 14b of the flangeless coupler 14 may be tapered so that, when the coupler is disposed within the conduits 10, 12, the tapered ends 14a, 14b of the coupler contact the beginning part 10c, 12c of the flared end regions 10b, 12b of the conduits 10, 12 to fully engage or seat the coupler in the conduits and to provide a uniform inside diameter from one conduit along the coupler and to the other conduit.

Figure 5:
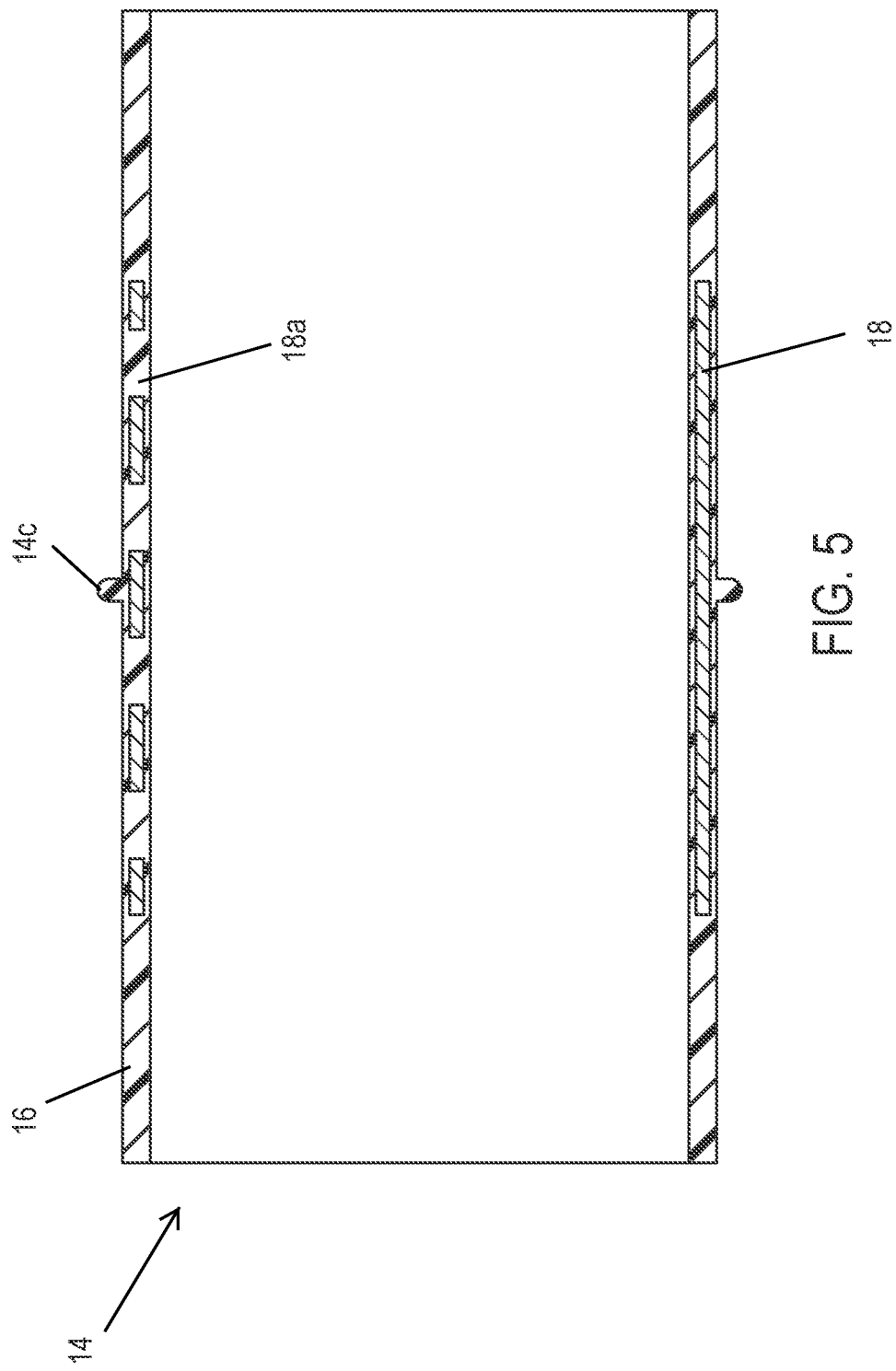
FIG. 5 is a sectional view of the flangeless coupler of FIG. 4.

In some implementations, the tapered ends 14a, 14b may be formed at an angle relative to an inner surface or longitudinal axis of the coupler 14, the angle being between 0 degrees and 90 degrees, such as between, for example, 30 degrees and 60 degrees, or other suitable angle or taper. For example, the angle may be substantially equal to an angle formed by the beginning part 10c, 12c of the flared end regions 10a, 12a of the conduits 10, 12. In some implementations, the angle of the first tapered end 14a may be different than or equal to the angle of the second tapered end 14b. That is, the angle of each tapered end 14a, 14b may be tailored to match the angle of the beginning part 10c, 12c of the flared end regions of each corresponding conduit 10, 12. Optionally, the form of the ends of the coupler may be curved or otherwise shaped to generally correspond to or match a curvature or form of the inside surface of the conduits at the start of the flared region. Optionally, and such as shown in FIG. 5, the ends of the coupler may not be tapered.

Figure 6:
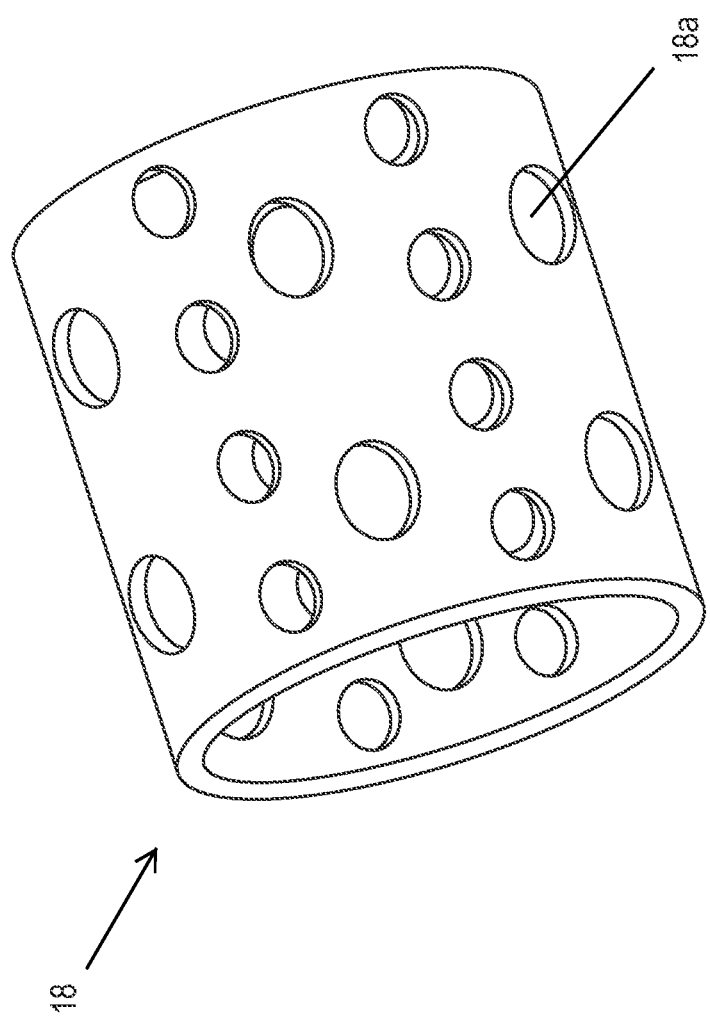
FIG. 6 is a perspective view of the metallic insert of the flangeless coupler.

The flangeless coupler 14 comprises a plastic or polymeric element 16 (such as, for example, a fluoropolymer or thermoplastic material) that is overmolded (such as via injection molding of a polymeric resin) over a metallic insert or element 18 to provide rigidity and strength to the coupler. The metallic insert 18 (FIG. 6) comprises a perforated hollow cylindrical element that has a plurality of holes 18a established therethrough. The holes or perforations 18a allow for the polymeric material of the element 16, when overmolded at and around the metallic insert 18, to flow through the metallic insert at the perforations 18a and fully encapsulate the metallic insert within the polymeric part 16. While the perforations 18a are shown as having shapes resembling circles or ovals, it is understood that the perforations may have any suitable shape and size. Further, the metallic insert 18 may include any suitable number of perforations 18*a*. The metallic insert 18 and perforations 18*a* allow for application of a greater vacuum force during formation of the part, as the part does not collapse and the polymeric material does not pull away from the metallic insert when exposed to the greater vacuum force.

As discussed above, the flangeless coupler 14 is formed such that the inside diameter of the coupler 14 is approximately or substantially the same as the inside diameter of the conduits to be joined. Thus, the inside diameter of the metallic insert is slightly larger than the inside diameter of the formed coupler 14 (due to the layer of the polymeric material along the inside surface of the metallic insert when the coupler is formed). As discussed above, the ends of the polymeric part 16 of the coupler are tapered to form the tapered ends 14*a*, 14*b* that correspond with the flaring of the conduits at the beginning of the end regions of the conduits that are to be joined. In some implementations, the tapered ends 14*a*, 14*b* are formed at the same time as the rest of the polymeric element 16 (e.g., a mold used to form the polymeric element 16 may include tapered ends corresponding to the tapered ends 14*a*, 14*b*). In other implementations, the polymeric element 16 may be formed with substantially flat ends, and the tapered ends 14*a*, 14*b* may be subsequently formed into the polymeric element 16 via, e.g., grinding, milling, etc.

Optionally, the coupler 14 may include a ridge 14*c* established at its outer surface at about a midpoint along the coupler. In other implementations, the ridge 14*c* may be offset and disposed closer to one end of the coupler 14 than the other end of the coupler 14 (depending on the particular application of the coupler and on the conduits to be joined by the coupler). The ridge 14*c* protrudes radially outwardly from the outer surface of the molded part 16 of the coupler (and is molded as part of the molded part 16) and circumscribes (or at least partially circumscribes) the coupler. In other implementations, the ridge 14*c* may comprise a separate component that is subsequently affixed (e.g., via welding, adhesive, mechanical fasteners, etc.) to the molded part 16 after the molded part has been formed.

The ridge 14*c* protrudes so as to provide a stop surface at each side of the ridge for the end of the respective conduit to engage when the coupler is inserted into the flared end regions 10*b*, 12*b* of the conduits 10, 12. Thus, each conduit 10, 12 receives the same amount of the coupler 14 in each flared end, which locates the coupler at the appropriate location in each conduit 10, 12, with the tapered ends of the coupler being at the beginning of the flared ends of the conduits (as shown in FIGS. 2 and 3). That is, a distance from the end 10*a*, 12*a* of each conduit 10, 12 to the beginning 10*c*, 12*c* of each flared end region 10*b*, 12*b* may be equal to a distance from the ridge 14*c* (i.e., each side surface of the ridge 14*c*) to each end 14*a*, 14*b* of the coupler 14.

After the coupler is received in both end regions 10*b*, 12*b* of the conduits 10, 12 to be joined, the assembly is heated to fuse the polymeric part 16 of the coupler at the inner surfaces of the conduits 10, 12 to seal the coupler therein. For example, the joint assembly (comprising conduits 10, 12 and coupler 14) may be exposed to a temperature greater than 200 degrees C., or greater than 300 degrees C., whereby the polymeric material of the part 16 will fuse with the inside surface material of the conduits 10, 12 (which may comprise an inner surface liner or may comprise a polymeric material that bonds or fuses with the polymeric coupler when exposed to high temperatures). For example, the joint may be exposed to a temperature less than (but close to) the melting point of the polymeric part 16 and/or the inner surface material of the conduits, whereby the materials may fuse together without losing their formed shapes.

When the conduits and coupler are heated, the conduits may conform to the outer surface or shape of the coupler to engage and seal along the coupler and to seal at the ends of the coupler (whether or not the ends of the coupler are tapered). With the coupler sealed or fused at the conduits, the conduit and joint assembly provides a substantially uniform inside diameter and is resistant to leaking of the liquids or gasses conveyed by the conduit assembly.

Therefore, the present invention provides a flangeless coupler for coupling opposed ends of conduits together without need for flanges that bolt together or are otherwise secured together. The flangeless coupler comprises a plastic component that is overmolded over and through a perforated metallic component to provide a robust coupler that can withstand high and low pressures (including negative pressure or vacuum) during manufacture and during use of the coupler in a conduit assembly. The flangeless coupler may include tapered ends to engage and correspond with the flaring shape of the flared ends of the conduits, and the flangeless coupler may have a circumferential rib or protrusion at its midpoint (midway longitudinally along the coupler) to act as a stop surface or locating element for the conduits at each side to engage, thereby ensuring that the coupler is received an appropriate amount in the ends of the conduits. By flaring the ends of the conduits and forming the coupler to have an overall thickness that corresponds with the amount of flaring of the conduit ends, the coupler provides an inside diameter that is substantially constant or uniform along the insides of the conduits and at the junction or joint where the coupler is disposed.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A conduit joint that joins opposing ends of two conduits together, the conduit joint comprising:
    a first conduit having a first end and a first flared end region, wherein the first flared end region is flared so that an inside diameter of the first flared end region is greater than an inside diameter of the first conduit remote from the first flared end region;
    a second conduit having a second end and a second flared end region, wherein the second flared end region is flared so that an inside diameter of the second flared end region is greater than an inside diameter of the second conduit remote from the second flared end region;
    a coupler that is received in the first flared end region of the first conduit and the second flared end region of the second conduit;
    wherein the coupler comprises a metallic element and a polymeric element overmolded at the metallic element, and wherein the metallic element comprises a hollow cylindrical element having a plurality of perforations established therethrough, and wherein the polymeric element is overmolded at the metallic element so that the metallic element is encapsulated by the polymeric element with the polymeric element present within the perforations of the metallic element; and
    wherein, with the coupler received in the first flared end region of the first conduit and in the second flared end region of the second conduit, the coupler is fused to inner surfaces of the first and second flared end regions of the first and second conduits.

2. The conduit joint of claim 1, wherein the coupler has an inside diameter that corresponds with the inside diameter of the first and second conduits remote from the respective first and second flared end regions.

3. The conduit joint of claim 1, wherein the polymeric element of the coupler comprises tapered ends that correspond with the flaring of the first and second flared end regions of the first and second conduits.

4. The conduit joint of claim 3, wherein the tapered ends of the polymeric element are formed at an angle between 30 degrees and 60 degrees.

5. The conduit joint of claim 1, wherein the coupler has an outer surface that engages the inner surfaces of the first and second flared end regions.

6. The conduit joint of claim 5, wherein the coupler comprises a circumferential protrusion that protrudes radially outwardly beyond the outer surface of the coupler, and wherein the protrusion functions to locate the coupler relative to the first and second conduits via engagement of the protrusion by the first and second ends of the first and second conduits when the coupler is received in the first and second flared end regions of the first and second conduits.

7. The conduit joint of claim 6, wherein the coupler has an inside diameter that corresponds with the inside diameter of the first and second conduits remote from the respective first and second flared end regions.

8. The conduit joint of claim 7, wherein the coupler comprises tapered ends that correspond with the flaring of the first and second flared end regions of the first and second conduits, such that the outer surface of the coupler and the outer surface of the tapered ends engage the inner surfaces of the first and second flared end regions.

9. The conduit joint of claim 1, wherein the coupler is fused to the inner surfaces of the first and second conduits by exposure of the conduit joint to a temperature greater than 200 degrees C.

10. A method of joining opposed ends of two conduits together, the method comprising:
providing a first conduit having a first end and a first flared end region;
providing a second conduit having a second end and a second flared end region;
providing a coupler, wherein the coupler comprises a metallic element and a polymeric element overmolded at the metallic element, and wherein the metallic element comprises a hollow cylindrical element having a plurality of perforations established therethrough, and wherein the polymeric element is overmolded at the metallic element so that the metallic element is encapsulated by the polymeric element with the polymeric element present within the perforations of the metallic element;
inserting a first part of the coupler into the first flared end region of the first conduit and inserting a second part of the coupler into the second flared end region of the second conduit; and
fusing the coupler to inner surfaces of the first and second flared end regions of the first and second conduits.

11. The method of claim 10, wherein the coupler has an inside diameter that corresponds with the inside diameter of the first and second conduits remote from the respective first and second flared end regions.

12. The method of claim 11, wherein the coupler has an outer surface that engages the inner surfaces of the first and second flared end regions.

13. The method of claim 12, wherein the polymeric element of the coupler comprises tapered ends that correspond with the flaring of the first and second flared end regions of the first and second conduits, and wherein inserting the first and second parts of the coupler into the first and second flared end regions comprises inserting the first and second parts of the coupler into the first and second flared regions until the tapered ends engage the flared inner surfaces of the first and second flared end regions.

14. The method of claim 10, wherein the coupler comprises a circumferential protrusion that protrudes radially outwardly beyond an outer surface of the coupler, and wherein inserting the first and second parts of the coupler into the first and second flared regions comprises inserting the first and second parts of the coupler into the first and second flared regions until the first and second ends engage the circumferential protrusion of the coupler.

15. The method of claim 10, wherein fusing the coupler to the inner surfaces of the first and second flared end regions comprises exposure of the first and second flared end regions at the coupler to a temperature greater than 200 degrees C.

* * * * *